United States Patent
Cottone et al.

(10) Patent No.: US 6,677,958 B2
(45) Date of Patent: *Jan. 13, 2004

(54) METHOD FOR CALIBRATING, CHARACTERIZING AND DRIVING A COLOR FLAT PANEL DISPLAY

(75) Inventors: Patrick L. Cottone, East Rochester, NY (US); Paula J. Alessi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 09/950,245

(22) Filed: Sep. 10, 2001

(65) Prior Publication Data

US 2003/0048264 A1 Mar. 13, 2003

Related U.S. Application Data (63) Continuation-in-part of application No. 09/887,152, filed on Jun. 22, 2001.

(51) Int. Cl.[7] .................................................. G09G 5/02
(52) U.S. Cl. ........................ 345/589; 345/603; 345/83; 345/690; 382/167
(58) Field of Search ................................ 345/593, 595, 345/597, 598, 603, 690, 207, 82, 83, 589, 590, 591; 348/179, 180, 184, 181; 382/162, 167

(56) References Cited

U.S. PATENT DOCUMENTS

| | | | | |
|---|---|---|---|---|
| 5,371,537 A | * | 12/1994 | Bohan et al. | 348/181 |
| 5,528,339 A | * | 6/1996 | Buhr et al. | 355/32 |
| 5,694,227 A | * | 12/1997 | Starkweather | 358/504 |
| 5,739,809 A | * | 4/1998 | McLaughlin et al. | 345/594 |
| 5,754,222 A | * | 5/1998 | Daly et al. | 348/184 |
| 5,881,209 A | * | 3/1999 | Stokes | 358/1.9 |
| 6,023,264 A | * | 2/2000 | Gentile et al. | 345/596 |
| 6,108,008 A | * | 8/2000 | Ohta | 345/590 |
| 6,160,644 A | * | 12/2000 | Lin | 358/518 |
| 6,205,244 B1 | * | 3/2001 | Bawolek et al. | 382/162 |
| 6,222,932 B1 | * | 4/2001 | Rao et al. | 382/100 |
| 6,320,325 B1 | * | 11/2001 | Cok et al. | 315/169.3 |
| 6,320,980 B1 | * | 11/2001 | Hidaka | 382/167 |
| 6,522,313 B1 | * | 2/2003 | Cottone | 345/22 |

OTHER PUBLICATIONS

Luo et al., The LLAB (l:c) Colour Model, *Color research and application*, vol. 21, No. 6, Dec. 1996, pp. 412–429.

* cited by examiner

Primary Examiner—Xiao Wu
(74) Attorney, Agent, or Firm—Thomas H. Close (57) ABSTRACT

A method of calibrating a flat panel, includes the steps of: providing a flat panel display having an overall and individual channel adjustment for both gain and offset and an adjustment to provide a white point for the display, the white point including color temperature, chromaticity and luminance level; displaying a first target using a low level code value for each channel of the display; sensing the luminance level of the displayed first target; adjusting the gain of the display so that the sensed luminance level matches a first predetermined aim value representing a luminance level at least 3 decades lower than a maximum luminance level; displaying a second target using intermediate code values for each channel of the display device; sensing the luminance level and chromaticities of the displayed second target; adjusting the individual channel offsets so that the luminance level matches a second predetermined aim value representing an intermediate luminance level and the chromaticities match a first set of predetermined chromaticities that represent a desired white point; displaying a third target using maximum code values for each channel of the display; sensing the luminance level and chromaticities of the displayed third target; adjusting the individual channel gains so that the luminance level matches a third predetermined aim value the maximum luminance level and the chromaticities match the first set of predetermined chromaticities; and repeating until no further adjustment is required.

6 Claims, 8 Drawing Sheets

METHOD FOR CALIBRATING, CHARACTERIZING AND DRIVING A COLOR FLAT PANEL DISPLAY

CROSS-REFERENCE TO RELATED APPLICATIONS

This is a continuation-in-part of application Ser. No. 09/887,152, filed Jun. 22, 2001, entitled "Method for Calibrating, Characterizing and Driving a Color Flat Panel Display" by Cottone et al.

FIELD OF THE INVENTION

The invention relates generally to the field of image display technology, and in particular to processes for characterizing and driving flat panel displays such as Organic Light Emitting Diode (OLED) Displays.

BACKGROUND OF THE INVENTION

In today's digital infoimaging world, many images are previewed and manipulated on low-power, hand-held portable electronic flat panel displays. New display applications (i.e. cell phones, DVD, palm pilots, video games, GPS, etc.) impose greater design requirements and improved imaging performance than other imaging display devices used previously. Displays are intended to provide a realistic representation of the images to the viewer, thus there is a need to correct display color and tonal responses to enhance the display image quality. The color and tonal enhancement must be implemented in the display's imaging chain.

Flat panel displays such as OLED displays have the potential for providing superior performance in brightness and color resolution, wide viewing angle, low power consumption, and compact and robust physical characteristics. However, unlike CRTs, these flat panel displays have a fixed white point and a chromatic neutral response that result from the manufacturing process, and are not adjustable. Variations in the manufacturing process result in variations in the white point and chromatic neutral and therefore unwanted variations in display color reproduction. With manufacturing processing variability and the need to increase yield to lower costs, it becomes imperative to develop robust and easy to implement color characterization and display driving techniques that accommodate for manufacturing variations.

There is a need therefore for an improved method of calibrating and driving flat panel displays.

SUMMARY OF THE INVENTION

The need is met according to the present invention by providing a method of calibrating a flat panel, comprising the steps of:
  a) providing a flat panel display having an overall and individual channel adjustment for both gain and offset, and an adjustment to provide a white point for the display, the white point including color temperature, chromaticity and luminance level;
  b) displaying a first target using a low level code value for each channel of the display;
  c) sensing the luminance level of the displayed first target;
  d) adjusting the gain of the display so that the sensed luminance level matches a first predetermined aim value representing a luminance level at least 3 decades lower than a maximum luminance level;
  e) displaying a second target using intermediate code values for each channel of the display device;
  f) sensing the luminance level and chromaticities of the displayed second target;
  g) adjusting the individual channel offsets so that the luminance level matches a second predetermined aim value representing an intermediate luminance level and the chromaticities match a first set of predetermined chromaticities that represent a desired white point;
  h) displaying a third target using maximum code values for each channel of the display;
  i) sensing the luminance level and chromaticities of the displayed third target;
  j) adjusting the individual channel gains so that the luminance level matches a third predetermined aim value representing a maximum luminance level and the chromaticities match the first set of predetermined chromaticities; and
  k) repeating steps e) through j) a number of times until no further adjustment is required in step j).

According to a further aspect of the invention, the flat panel display is characterized by displaying further targets using intermediate code values for each channel of the display device; sensing the luminance level and chromaticities of the displayed further targets; and adjusting the individual channel offsets so that the luminance level matches the second predetermined aim value representing an intermediate luminance level and the chromaticities match a first set of predetermined chromaticities that represent a desired white point.

According to a still further aspect of the invention, a method for driving a color flat panel display with RGB code values, includes the steps of:
  a) converting the RGB code values to aim RGB intensities;
  b) transforming the aim RGB intensities to CIE XYZ values at a defined aim white point;
  c) translating the CIE XYZ values to corresponding XYZ tristimulus values for the flat panel display white point;
  d) transforming the corresponding XYZ tristimulus values to display RGB intensities;
  e) converting the display RGB intensities to display drive RGB code values; and
  f) applying the display drive RGB code values to the flat panel display.

ADVANTAGES

The present invention has the advantage of correcting the multi-channel flat panel display's neutral characteristic response to be achromatic. For example, it is capable of achieving achromatic responses for any given white point. It has the further advantage that the flat panel display driving algorithm can be easily implemented with software LUTs or with digital signal processing integrated circuit technology. The flat panel display characterization data can be stored onboard and changed if necessary, thus updating the driving algorithm for aging or customization. The present invention also has the advantage of modifying the multi-channel flat panel display's color reproduction in order to achieve an aim. Using the present invention, an aim color reproduction can be achieved for any given white point. Future applications can be further advantaged using the neutral correction and color reproduction data to enhance a flat panel display's visual appearance.

DETAILED DESCRIPTION OF THE INVENTION

Calibrating, characterizing and driving a flat panel display according to the present invention includes three components. First the flat panel display is calibrated to a desired white point. Next, the flat panel display is characterized for chromaticity and luminance. Finally, an image processing path is provided for driving the display.

Figure 1:
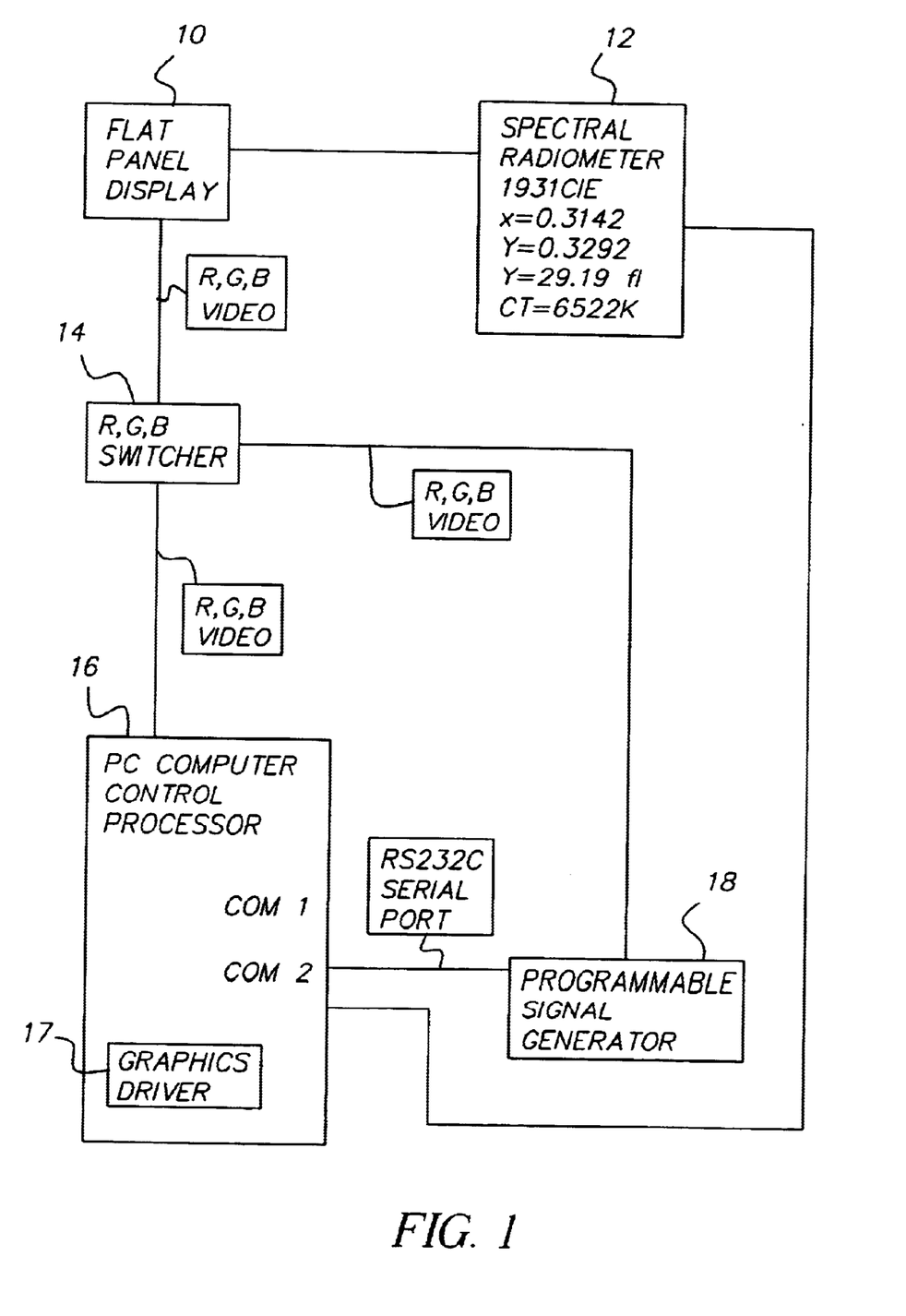
FIG. 1 is a schematic diagram of a system useful for calibrating and characterizing a flat panel display according to the present invention.

Referring to FIG. 1, a system useful in performing the optical characterization of a color flat panel display 10 according to the present invention is shown. According to the present invention, the flat panel display 10 is provided with electronic amplifiers to adjust each individual channel gain and offset and master adjustment controls for gain and offset. The master controls gang the individual channels together and allow simultaneous control of all channels. These controls will be used in setting the display white point for color and luminance. The components of the system include a spectral radiometer 12 with sufficient sensitivity and accuracy to measure the display spectra. A preferred spectral radiometer 12 is the PR-705 available from Photo Research, Chatsworth Calif., which has provision to read the measured light output via central processing unit 16 or manually using its built-in display.

The system includes means to produce video signals with the appropriate timing parameters to produce targets to be displayed on the flat panel display. The targets are a series of patches with code values representing the level of the patch. The targets can be generated by a programmable signal generator 18 (such as an ASTRO Model 819 programmable signal generator) or by a graphics card 17 in a central processing unit 16. The targets are created such that their timing and level match the input specifications of the flat panel display 10.

An R,G,B video switcher 14 can be used to select the signals from either the signal generator 18 or the central processing unit 16. The targets can be generated in the central processing unit 16 using commercial available software packages such as Adobe Photo Shop. Alternatively, a custom software program can be written to produce targets using the command structure for the graphics card 17. Another possible approach is to have the targets stored on a disk, such as a Photo CD and use the central processing display utilities to display the image of the targets.

Figure 2:
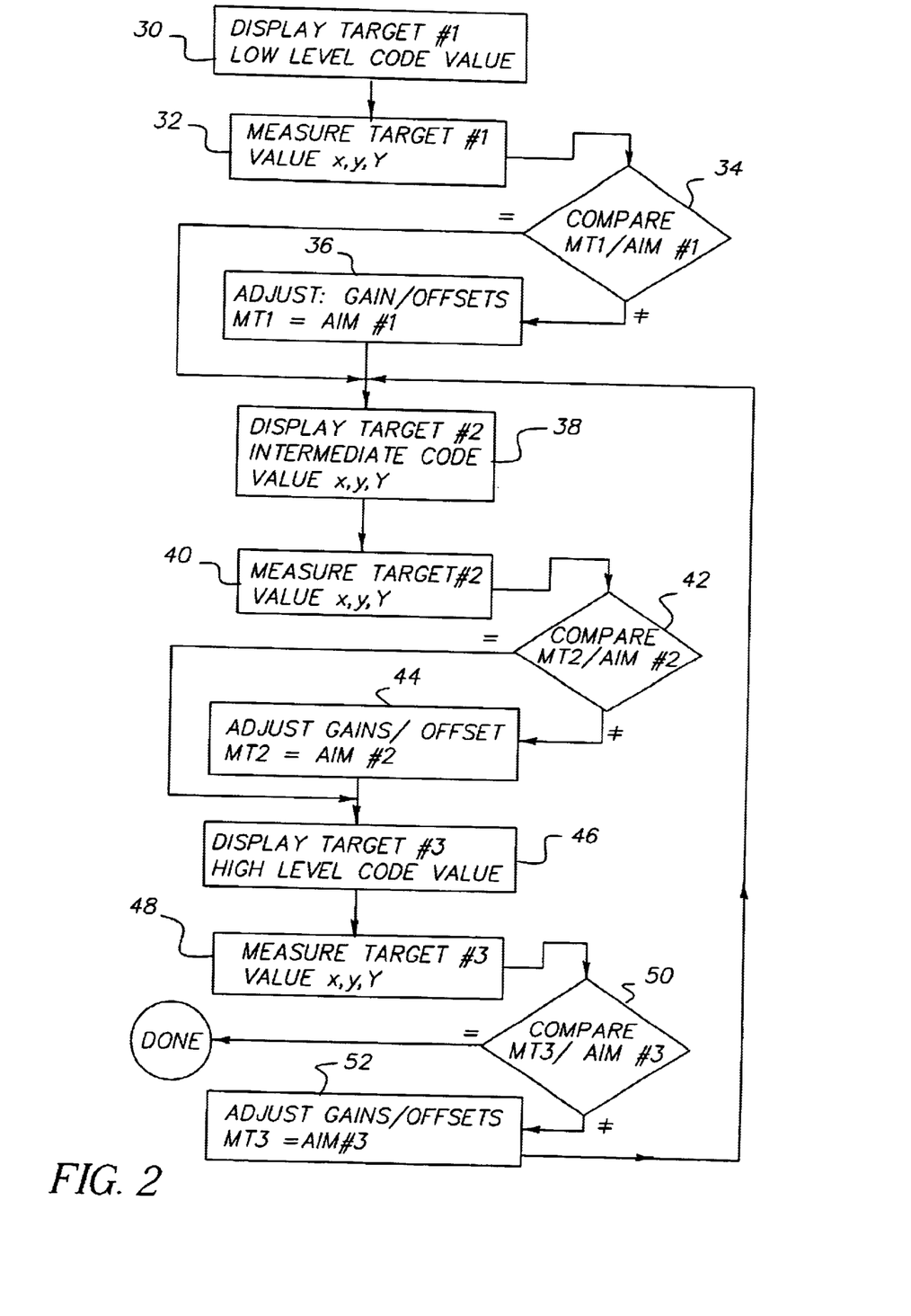
FIG. 2 is a flow chart showing the flat panel white point calibration process.

Referring to FIG. 2, the calibration of the desired white point is accomplished according to the present invention as follows. A first target using a low level code value for each channel is displayed 30. The luminance level of the displayed first target is sensed 32 using the spectral radiometer 12 and the measured RGB values are compared 34 to a first aim value representing a luminance level at least 3 decades lower than a maximum luminance level. The gain and offset of the display are then adjusted 36 so that the sensed luminance level matches the first predetermined aim value.

A second target is displayed 38 using intermediate code values for each channel of the display device. The luminance level and chromaticities of the displayed second target are sensed 40 and compared 42 with a second aim value representing an intermediate luminance level. The individual channel gains and offsets are then adjusted 44 so that the luminance level matches the second predetermined aim value and the chromaticities match a first set of predetermined chromaticities that represent a desired white point.

A third target using maximum code values for each channel of the display is displayed 46. The luminance level and chromaticities of the displayed third target are sensed 48 and compared 50 with a third aim value representing the maximum luminance level. The individual channel gains and offsets are then adjusted 52 so that the luminance level matches a third predetermined aim value and the chromaticities match the first set of predetermined chromaticities. The above steps are repeated until all three aims are achieved.

Figure 3:
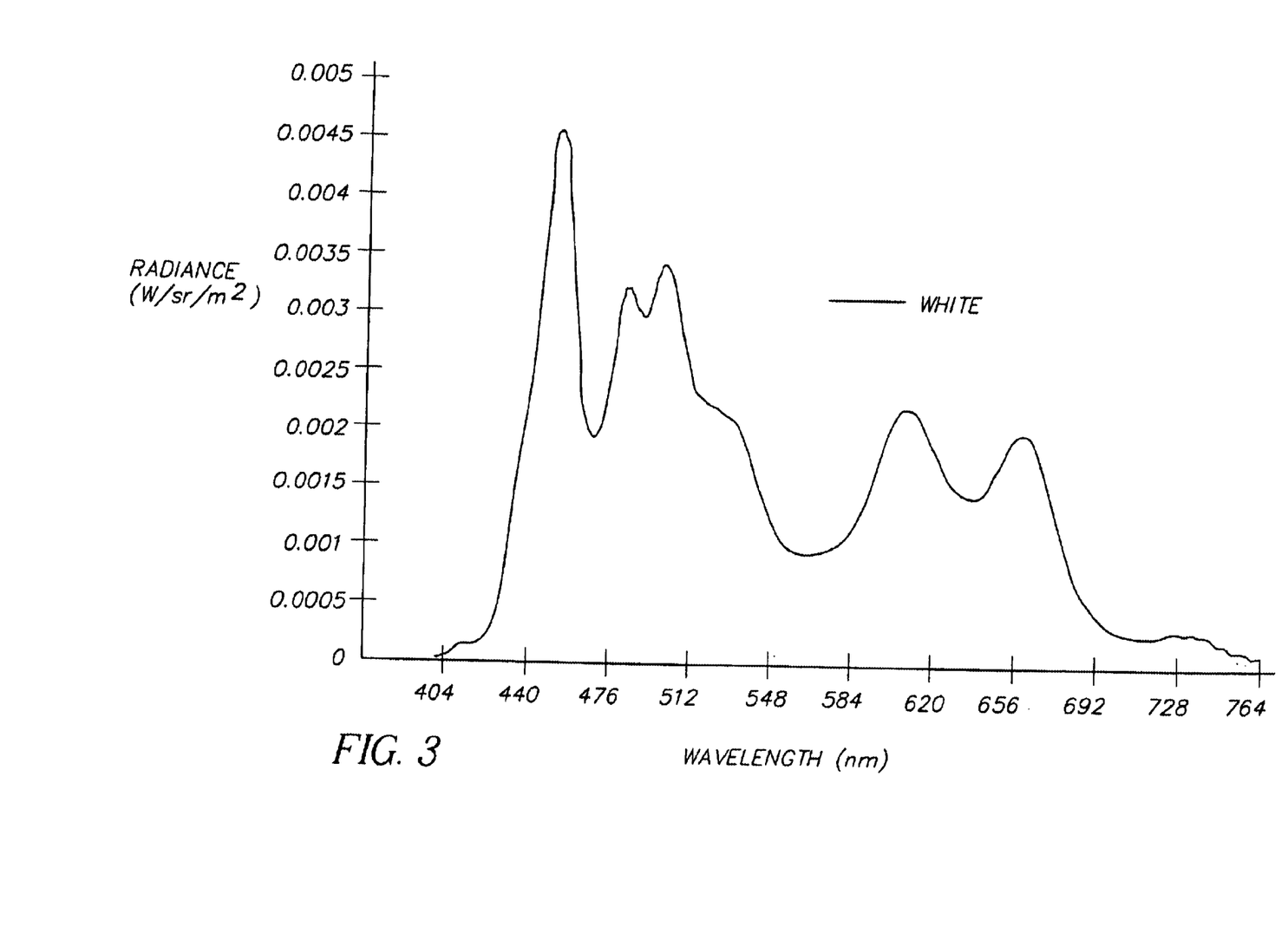
FIG. 3 is an example plot of the measured neutral target spectra.

The chromaticity and luminance characterization of the multi-channel flat panel display begins by measuring a series of test patterns (neutral targets) with equal signals for all channels Luminance and chromaticity data are calculated from the spectrum of each measured neutral target. An example of one measured neutral target spectrum for an OLED is shown in FIG. 3. The 1931 CIE chromaticity specification, therefore the x, y, Y were reported and displayed as illustrated in Table 1

TABLE 1

| Neutral Target Code Value | Y (cd/m2) | CIE31x | CIE31y |
| --- | --- | --- | --- |
| 0 | 4.08E−01 | 0.2778 | 0.5252 |
| 10 | 4.77E−01 | 0.2706 | 0.4714 |
| 20 | 6.95E−01 | 0.271 | 0.4332 |
| 30 | 1.07E+00 | 0.2753 | 0.4032 |
| 40 | 1.65E+00 | 0.283 | 0.3807 |
| 50 | 2.50E+00 | 0.2925 | 0.3647 |
| 65 | 4.39E+00 | 0.3053 | 0.3489 |
| 80 | 7.03E+00 | 0.3152 | 0.3399 |
| 95 | 1.04E+01 | 0.3215 | 0.3342 |
| 115 | 1.58E+01 | 0.3272 | 0.3297 |
| 135 | 2.21E+01 | 0.3307 | 0.3273 |
| 155 | 2.91E+01 | 0.3321 | 0.3255 |
| 175 | 3.66E+01 | 0.3305 | 0.3244 |
| 200 | 4.63E+01 | 0.3236 | 0.3236 |
| 225 | 5.63E+01 | 0.3131 | 0.3232 |
| 245 | 6.46E+01 | 0.3048 | 0.3236 |
| 255 | 6.89E+01 | 0.3019 | 0.3243 |

Figure 4:
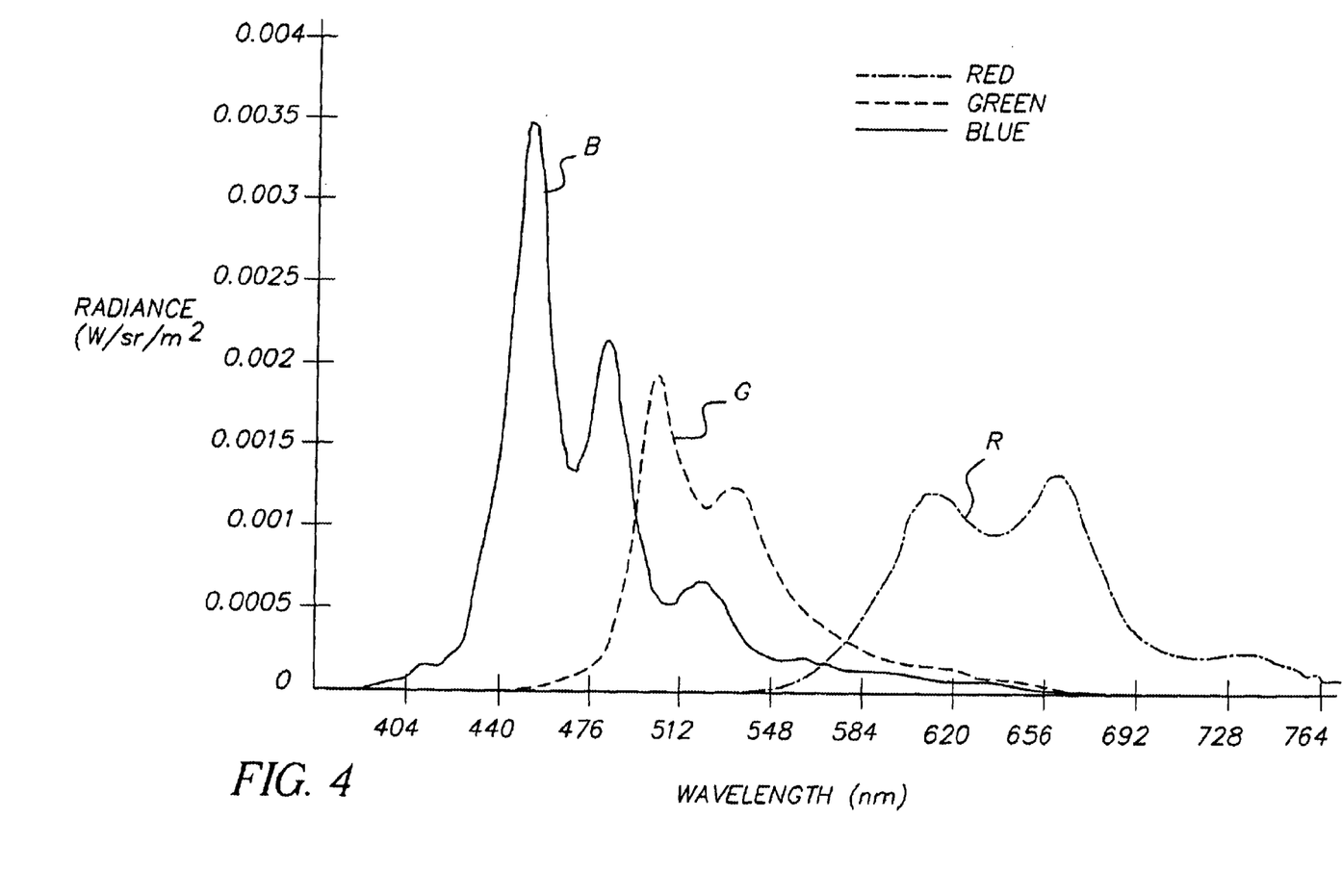
FIG. 4 is an example of the measured R G B primary spectra.

Next, the color primaries were set to their maximum level and measured. FIG. 4 is an example of the OLED flat panel display measured RGB spectra. Chromaticity and luminance are calculated from the spectra of each measured primary and are shown in Table 2

TABLE 2

| Color Primary | Y (cd/m2) | CIE31x | CIE31y |
|---|---|---|---|
| Red | 34.8 | 0.6534 | 0.3412 |
| Green | 21.6 | 0.2779 | 0.6521 |
| Blue | 22.8 | 0.1535 | 0.1965 |

The primary response data from Table 2 are converted to 1931 CIE XYZ tristimulus values for each red, green and blue primary. These primary XYZ values are used in equation 1 below to relate primary intensity (e.g. $R_i, G_i, B_i$) to 1931 CIE tristimulus values (XYZ) for any color stimulus. The general form of this equation for a three primary system is:

$$X = X_R R_i + X_G G_i + X_B B_i \quad (1)$$
$$Y = Y_R R_i + Y_G G_i + Y_B B_i$$
$$Z = Z_R R_i + Z_G G_i + Z_B B_i$$

The coefficients $X_R$, $Y_R$, and $Z_R$ are obtained from the xyY red primary data from Table 2 above. Similarly the green and blue coefficients are obtained from the green and blue primary data from Table 2. Typically the full red, green and blue intensities of a full drive white are normalized to produce the desired tristimulus values for the aim illuminant. In practice, the nine coefficients form a 3×3 matrix, which is very commonly used for this relationship. Also the inverse 22 of the above equations are needed to convert from tristimulus values to RGB intensities. The general form of this inverse relationship is more easily shown by the following matrix equation:

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix}^{-1} \begin{pmatrix} R_i \\ G_i \\ B_i \end{pmatrix} \quad (2)$$

An alternative approach to the matrix equations is the use of n dimensional look-up tables (n-dLUTs), where n is usually three or higher These can also be inverted.

Figure 5:
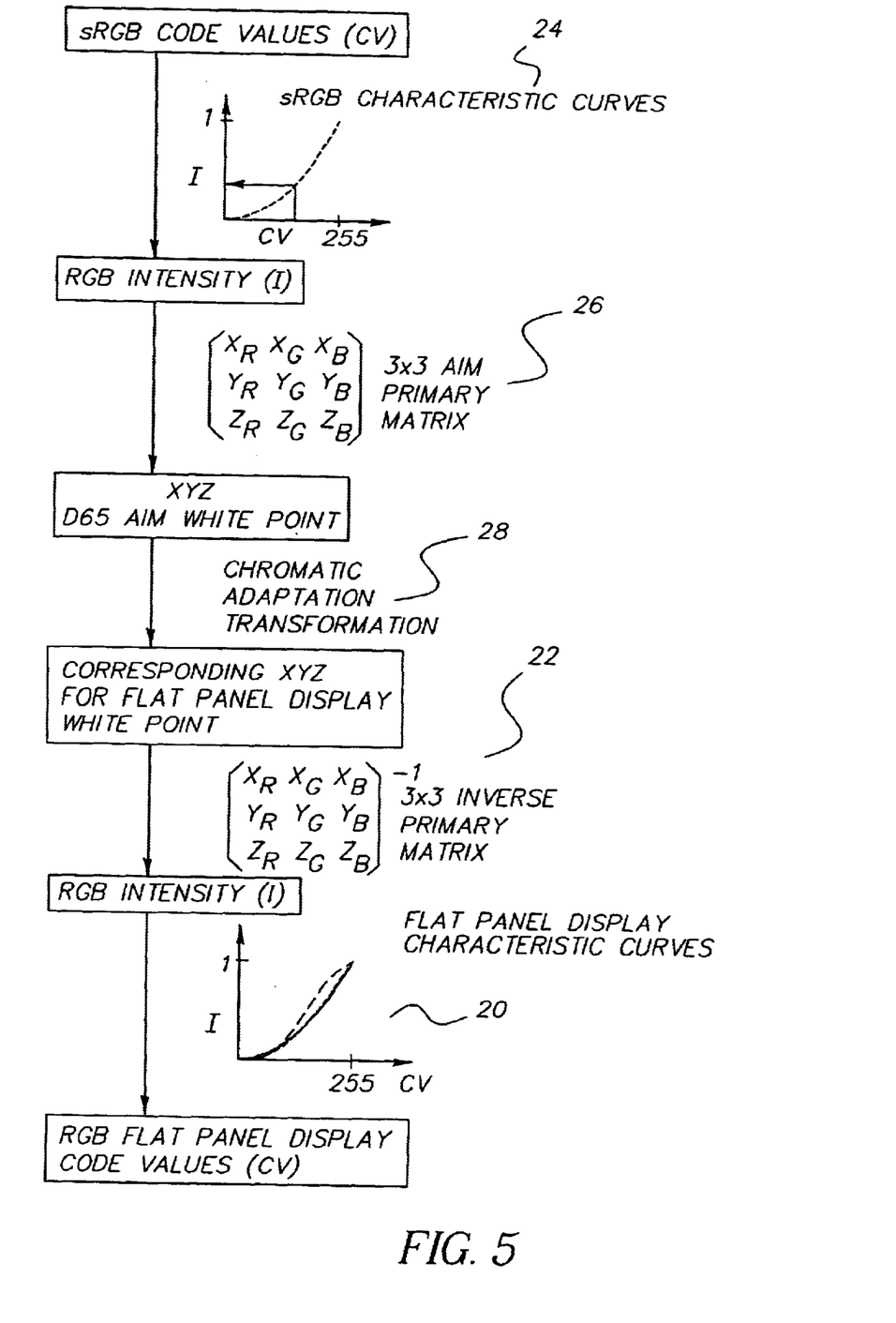
FIG. 5 is a flow chart showing the image processing path for driving a flat panel display according to the present invention.
Figure 6:
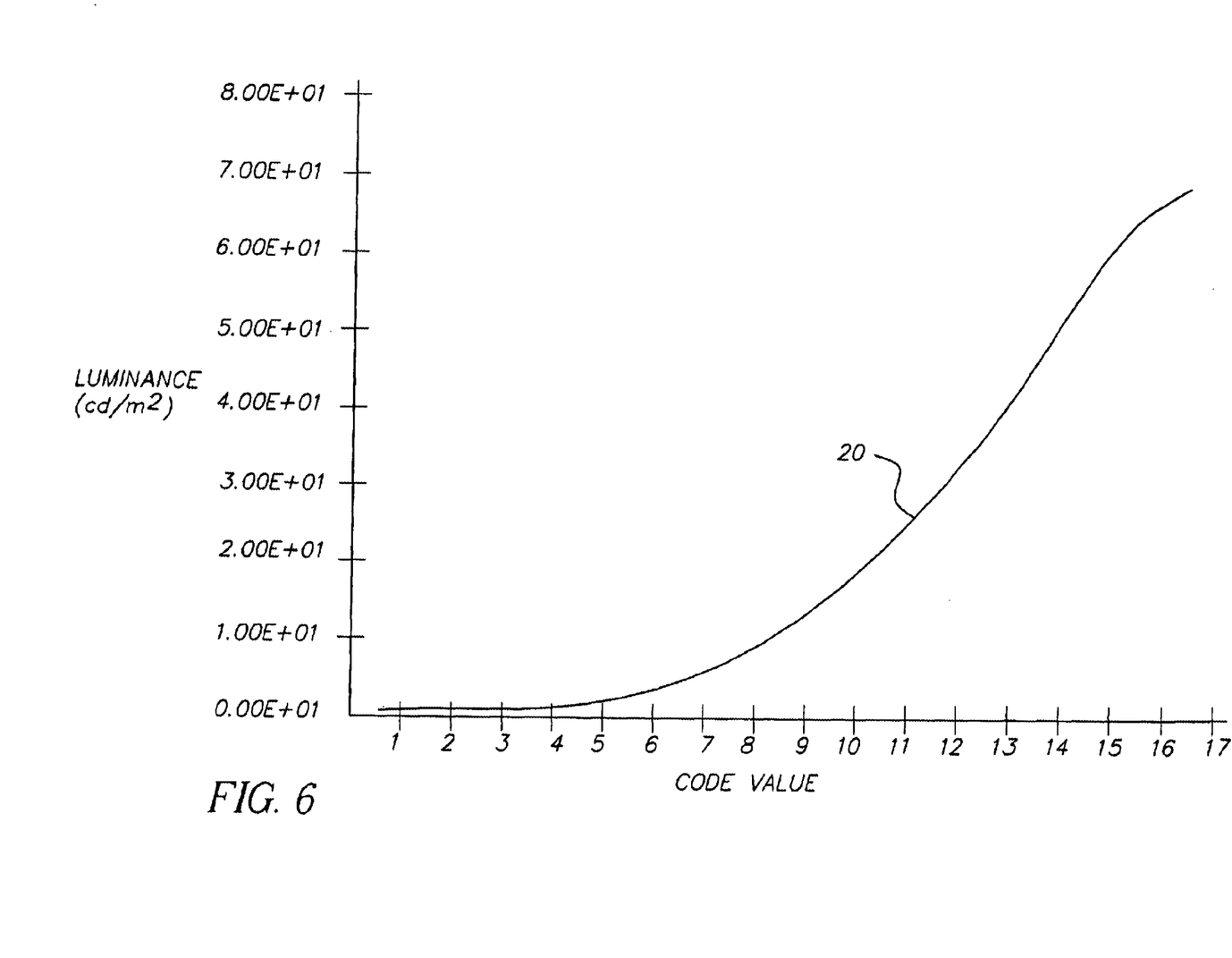
FIG. 6 is an example plot of the measured OLED characteristic curve.
Figure 7:
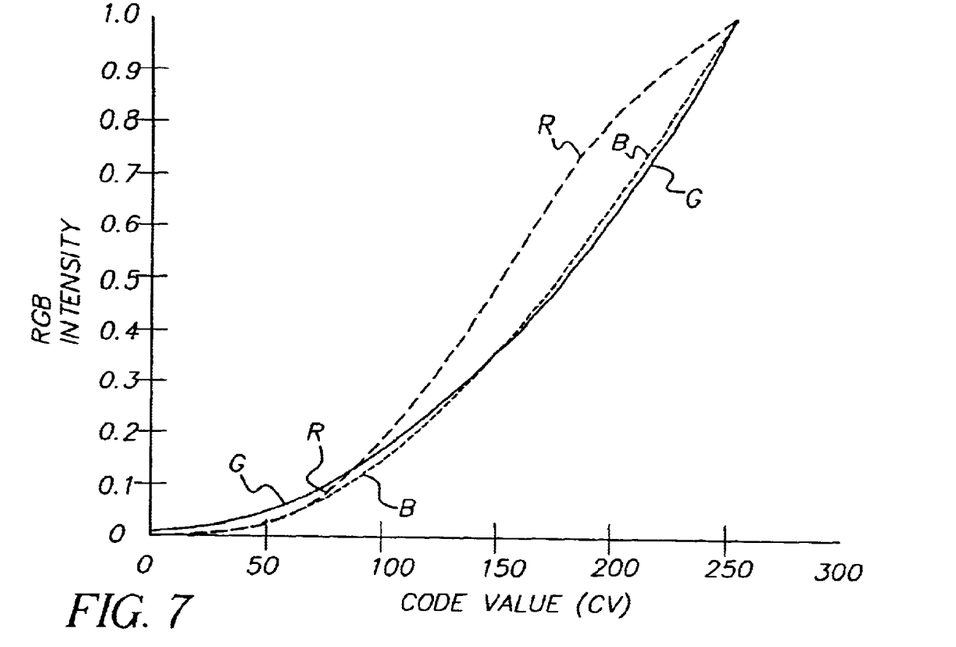
FIG. 7 is an example plot of the red, green and blue OLED characteristic curves.

Referring to FIG. 5, the above characterization data are used to compute the flat panel display characteristic curves 20. An example of an actual display measured luminance characteristic curve is shown in FIG. 6. The display characteristic curves 20 describe the relationships between RGB neutral target code values (Table 1) and the computed RGB primary light intensities. In order to obtain these display characteristic curves 20, the xyY data from Table 1 are used to compute XYZ tristimulus values for the neutral targets. The inverse primary relationship 22 is then used to compute red, green and blue intensities for the neutral targets. The data are then normalized so that each channel gives an intensity of 1.0 at full white. The result is a set of red, green and blue flat panel display characteristic curves 20 as shown in FIG. 7.

Figure 8:
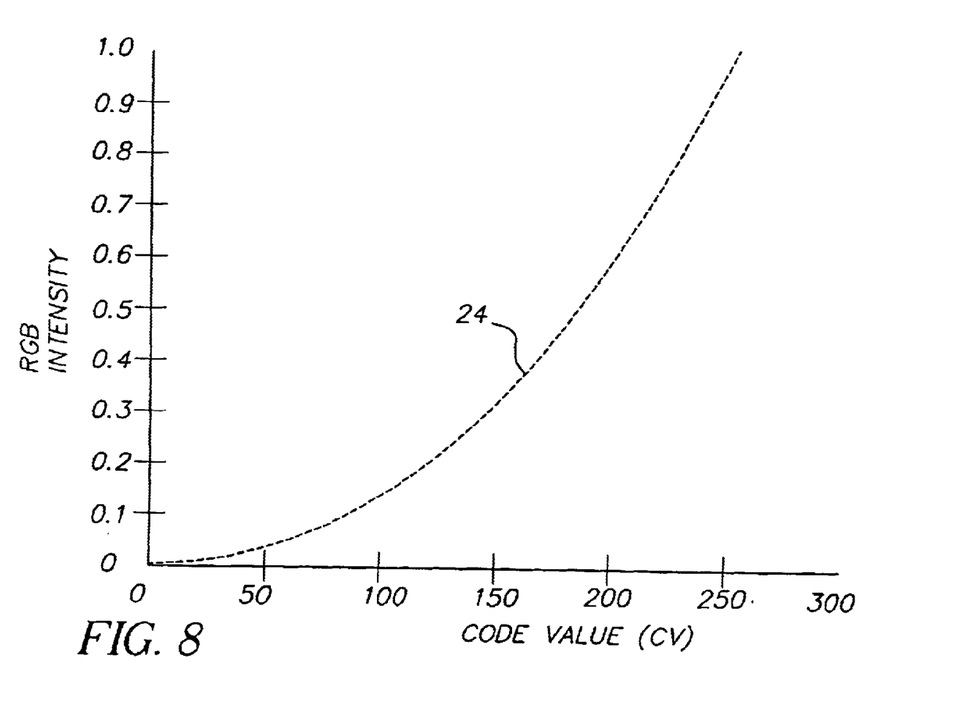
FIG. 8 is an example plot of aim sRGB characteristic curves.

The next step is to use the inverse primary matrix 22 and flat panel display characteristic curves 20 in the image processing chain shown in FIG. 5. The chain begins by mapping pixel-by-pixel red, green and blue image code values through a set of aim curves, such as the sRGB curves 24 shown in FIG. 8. This mapping converts sRGB image code values to red, green and blue intensities for each pixel. The red, green and blue intensity data are converted to aim CIE XYZ tristimulus values using an aim primary matrix 26 that represents the intended application with a specified white point. The format of the aim primary matrix is usually a n×n matrix normalized to an aim white point. For RGB three primary systems, n equals 3. Examples of aim matrices would be the EBU phosphor set with a CIE D65 white point or any specific aim that represents a specific gamut that you are trying to achieve for your desired white point aim. If the flat panel display 10 is not capable of achieving the aim white point tristimulus values, a chromatic adaptation transform 28 may be performed to achieve the corresponding XYZ values for the flat panel display's 10 white point. The chromatic adaptation transform 28 computes corresponding tristimulus values to insure equal color appearance between the aim and the display. Common chromatic adaptation transforms are the von Kries (see textbook Color Appearance Models by Mark D. Fairchild, Addison-Wesley, November 1997) and the Bradford equations (see M. R. Luo, M. -C. Lo and W. -G Kuo, "the LLAB(l:c) colour model" *Color Res. Appl.* 21, 412–429 (1996)). Alternatively, if the white point is very far away from the aim point in chromaticity space, it may not be desirable to perform the chromatic adaptation transform. In this case, one may skip the chromatic adaptation transform step. This allows one to achieve the aim neutral chromaticities at the expense of reduced luminance dynamic range.

Next, it is necessary to convert those corresponding tristimulus values for each image pixel to flat panel display red, green and blue intensities using the inverse primary matrix 22 as shown in equation 2. The last step in FIG. 5 is to map those red, green and blue intensities through the flat panel display characteristic curves 20 (FIG. 7) to produce red, green and blue code values that are used to drive the flat panel display 10.

Figure 9:
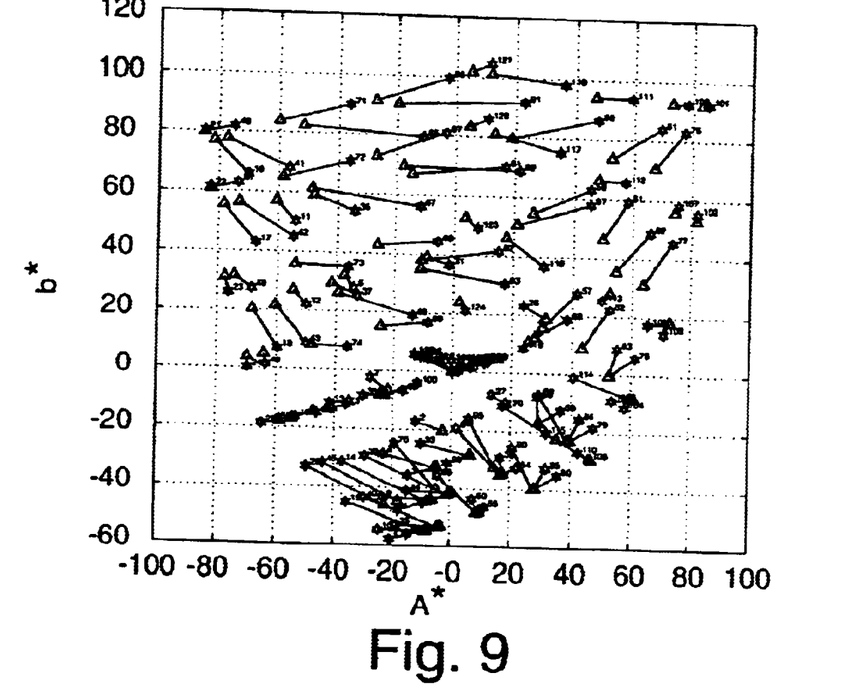
FIG. 9 is a b* vs a* vector plot illustrating before an after color enhancement.
Figure 10:
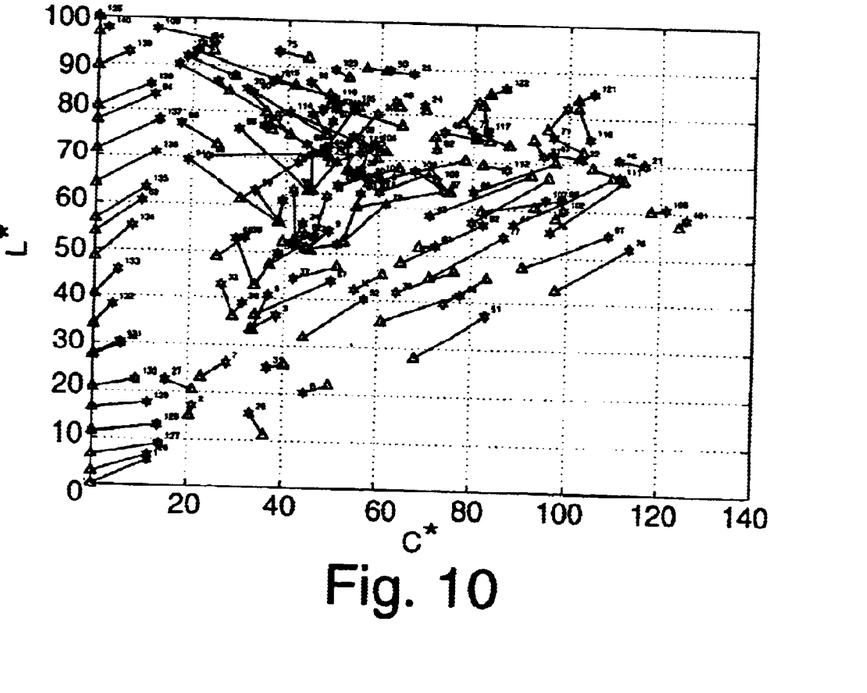
FIG. 10 is an L* vs C* vector plot illustrating before an after color enhancement.

In summary, FIG. 5 shows that images can be made to achieve a color enhanced position after being processed through the steps referred to above. FIGS. 9 and 10 show results in CIELAB space of the color enhancement algorithm applied to a color target as imaged on an OLED display. FIG. 9 is a b* vs a* vector plot showing the hue and chroma changes before and after color enhancement for the target colors. FIG. 10 is a L* vs C* vector plot showing the lightness and chroma changes before and after color enhancement for the target colors. Note that after color enhancement, the neutral scale becomes achromatic (i.e. a* and b* are close to zero for all neutral target colors).

The invention has been described in detail with particular reference to certain preferred embodiments thereof, but it will be understood that variations and modifications can be effected within the spirit and scope of the invention.

| | |
|---|---|
| 10 | flat panel display |
| 12 | spectral radiometer |
| 14 | video switcher |
| 16 | central processing unit |
| 17 | graphics card |
| 18 | programmable signal generator |
| 20 | display characteristic curves |
| 22 | inverse primary matrix |
| 24 | sRGB characteristic curves |
| 26 | aim primary matrix |
| 28 | chromatic adaptation transform |
| 30 | display target #1 |
| 32 | sense target #1 |
| 34 | compare target #1 to aim #1 |
| 36 | adjust gain/offset for #1 |
| 38 | display target #2 |
| 40 | sense target #2 |

-continued

| 42 | compare target #2 to aim #2 |
| 44 | adjust gain/offset for #2 |
| 46 | display target #3 |
| 48 | sense target #3 |
| 50 | compare target #3 to aim #3 |
| 52 | adjust gain/offset for #3 |

What is claimed is:

1. A method of calibrating a flat panel, comprising the steps of:

a) providing a flat panel display having an overall and individual channel adjustment for both gain and offset and an adjustment to provide a white point for the display, the white point including color temperature, chromaticity and luminance level, b) displaying a first target using a low level code value for each channel of the display;

c) sensing the luminance level of the displayed first target;

d) adjusting the gain of the display so that the sensed luminance level matches a first predetermined aim value representing a luminance level at least 3 decades lower than a maximum luminance level;

e) displaying a second target using intermediate code values for each channel of the display device;

f) sensing the luminance level and chromaticities of the displayed second target;

g) adjusting the individual channel offsets so that the luminance level matches a second predetermined aim value representing an intermediate luminance level and the chromaticities match a first set of predetermined chromaticities that represent a desired white point;

h) displaying a third target using maximum code values for each channel of the display;

i) sensing the luminance level and chromaticities of the displayed third target;

j) adjusting the individual channel gains so that the luminance level matches a third predetermined aim value the maximum luminance level and the chromaticities match the first set of predetermined chromaticities; and k) repeating steps e) through j) a number of times until no further adjustment is required in step j).

2. The method claimed in claim 1, further comprising the steps of:

displaying a further targets using intermediate code values for each channel of the display device;

sensing the luminance level and chromaticities of the displayed further targets; and adjusting the individual channel offsets so that the luminance level matches the second predetermined aim value representing an intermediate luminance level and the chromaticities match a first set of predetermined chromaticities that represent a desired white point.

3. A computer program product for implementing the method claimed in claim 1.

4. A display calibrated according to the method of claim 1.

5. A method for driving a color flat panel display with RGB code values, comprising the steps of:

a) converting the RGB code values to aim RGB intensities;

b) transforming the aim RGB intensities to CIE XYZ values at a defined aim white point;

c) transforming the corresponding XYZ tristimulus values to display RGB intensities;

d) converting the display RGB intensities to display drive RGB code values; and e) applying the display drive RGB code values to the flat panel display.

6. The method claimed in claim 5, further comprising the step of translating the CIE XYZ values to corresponding XYZ tristimulus values for the flat panel display white point prior to transforming the corresponding XYZ tristimulus values to display RGB intensities.

* * * * *